Jan. 11, 1927.  
F. LJUNGSTROM  
1,614,203  
REVERSING DEVICE FOR TOOTHED GEARING  
Filed April 13, 1922  5 Sheets-Sheet 1

Inventor  
F. Ljungstrom  
By Marks & Clerk

Jan. 11, 1927. 1,614,203
F. LJUNGSTROM
REVERSING DEVICE FOR TOOTHED GEARING
Filed April 13, 1922  5 Sheets-Sheet 2

Inventor
F. Ljungstrom,
By Marks&Clerk
Attys.

Jan. 11, 1927.
F. LJUNGSTROM
1,614,203
REVERSING DEVICE FOR TOOTHED GEARING
Filed April 13, 1922    5 Sheets-Sheet 4
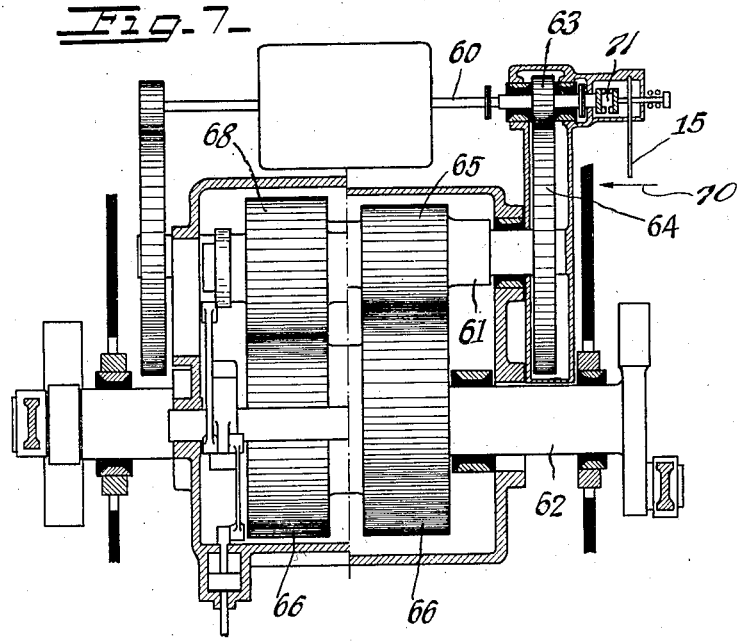
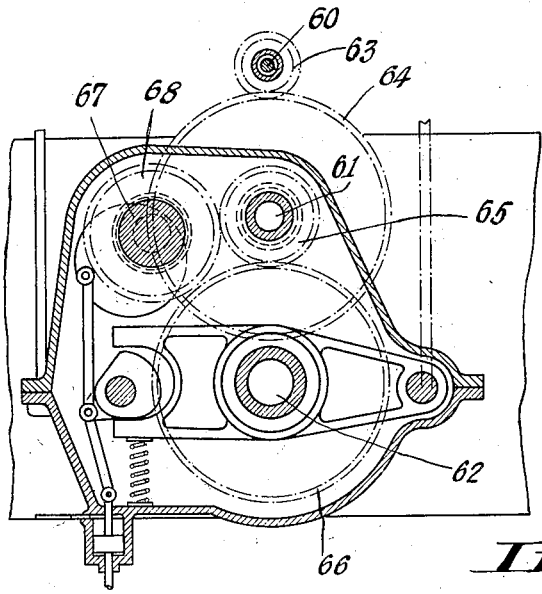
Inventor
F. Ljungstrom,
By Marks&Clerk
Attys.

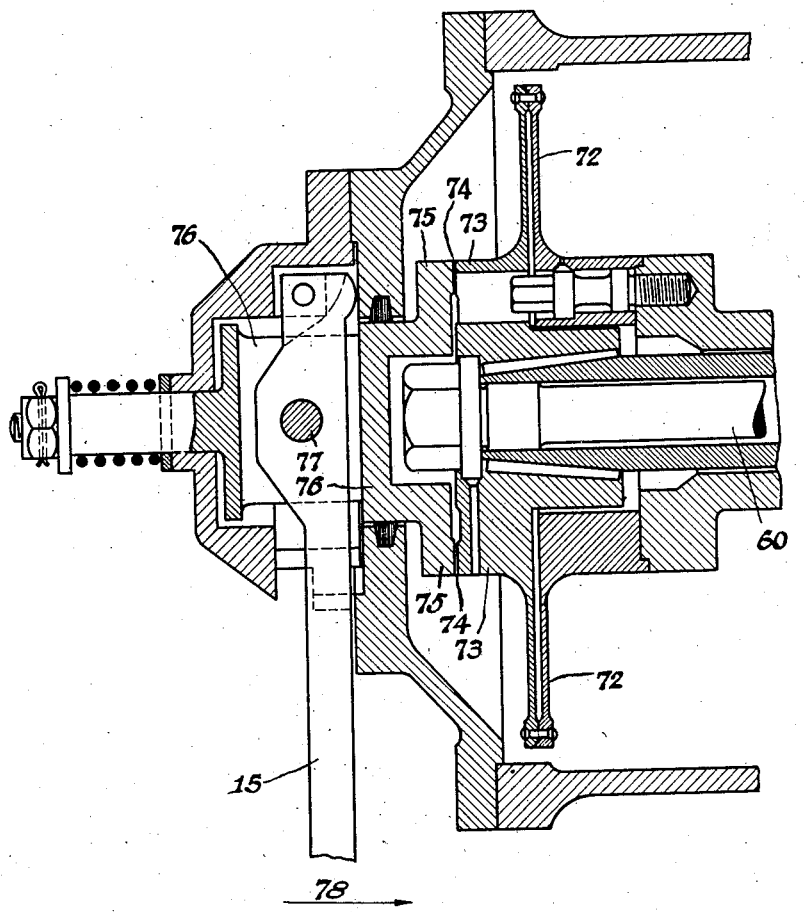

Patented Jan. 11, 1927.

1,614,203

UNITED STATES PATENT OFFICE.

FREDRIK LJUNGSTRÖM, OF LIDINGO-BREVIK, SWEDEN, ASSIGNOR TO AKTIEBOLAGET LJUNGSTRÖMS ANGTURBIN.

REVERSING DEVICE FOR TOOTHED GEARING.

Application filed April 13, 1922, Serial No. 552,423, and in Sweden December 24, 1921.

Reversing devices for toothed gearings are known in which the toothed wheels by radial movements may be alternately brought into and out of engagement with one another according to the desired direction of movement of the gearing. In U. S. Patent No. 1,388,351 such a reversing device is disclosed in which the movements necessary for the radial adjustment of the toothed wheels may be effected by the aid of oil pressure. In this patent means are also disclosed, by which a reversing operation is prevented, unless certain conditions are fulfilled, as for instance that all the toothed wheels of the gearing are stopped. In such reversing operation effected by radial adjustment of the toothed wheels it is necessary that the teeth of the one wheel are positioned right before the tooth spaces of the other wheel with which it is to mesh. Also for effecting such adjustment of the wheels in relation to one another it is suggested in the said patent to use oil pressure device. By this the suggested reversing devices will be considerably complicated and will comprise several members dependent on one another, which will interfere with a quite reliable operation of the devices.

This invention relates to a reversing device of the type mentioned above in which said inconveniences are prevented by using oil pressure devices known per se for the reversing operation of the toothed wheels, at least one of said wheels being provided with means for so adjusting the wheel that the teeth thereof are positioned right before the corresponding tooth spaces of another wheel, by which means the said wheel may be turned by hand independently of the other wheels.

Figure 1:
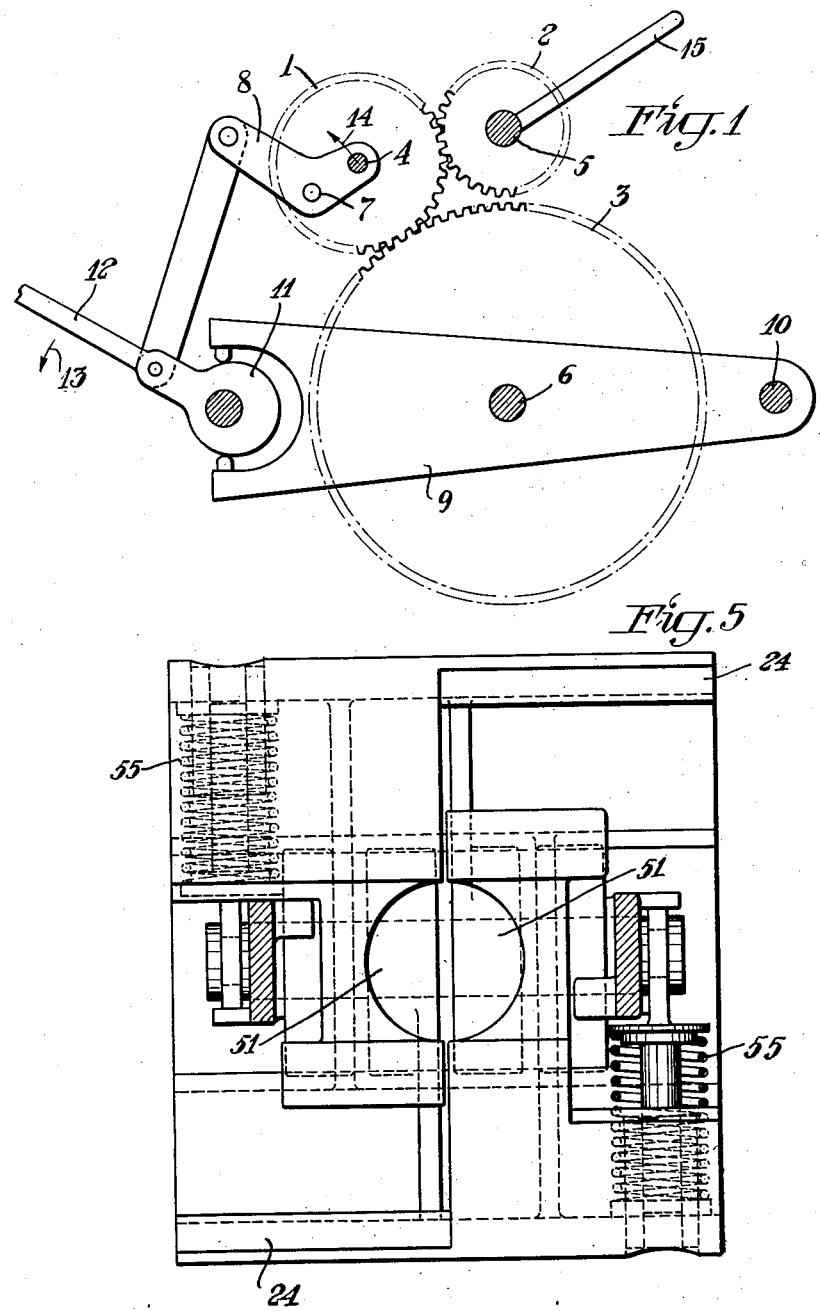
Figure 2:
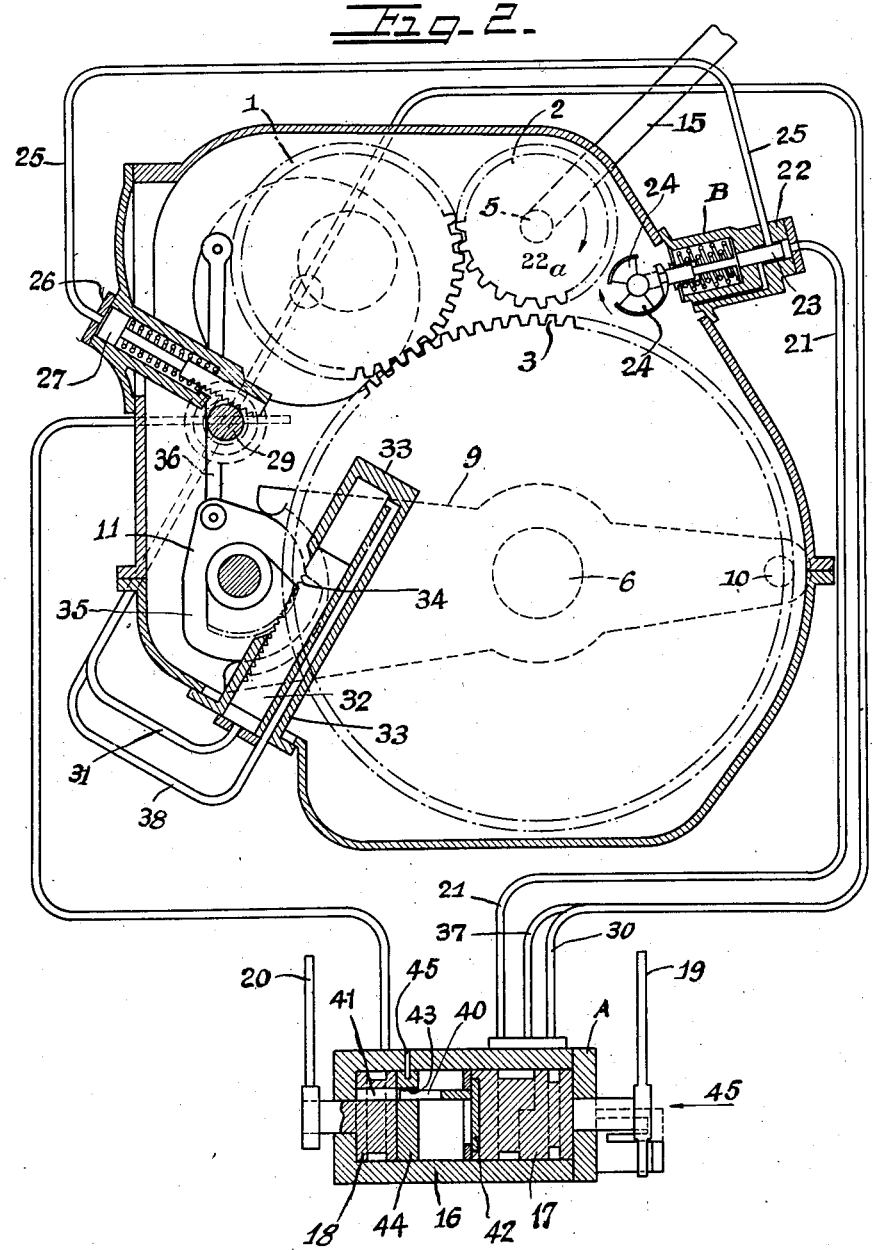
Figure 3:
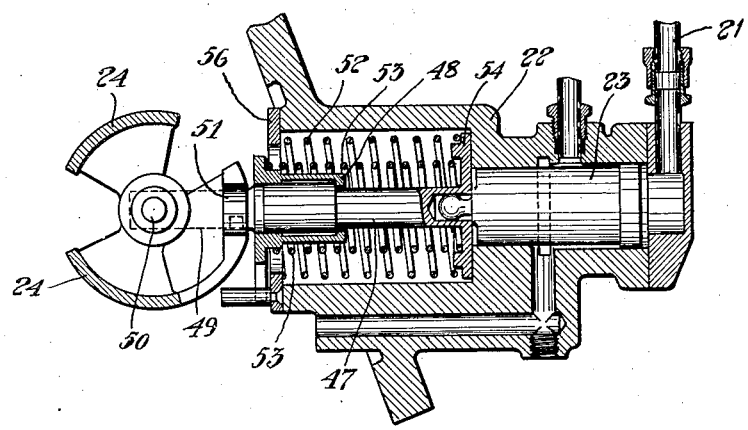
Figure 4:
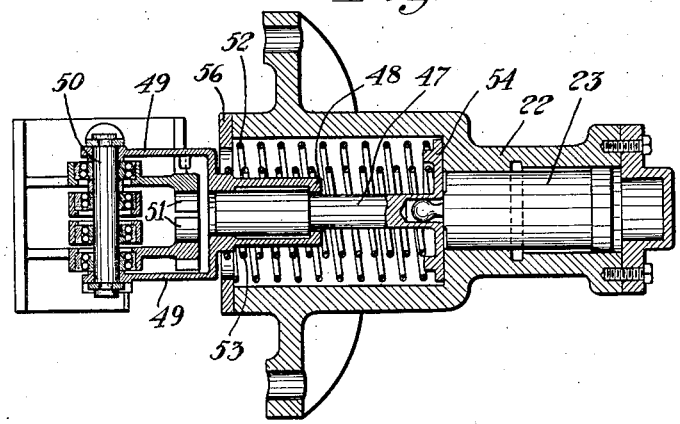

An embodiment of the invention is illustrated in the accompanying drawing in which:

Fig. 1 shows diagrammatically a reversing device constructed according to Patent No. 1,388,351 and to which the present invention is applied. Fig. 2 shows on a greater scale an embodiment of a reversing device constructed in this manner. Figs. 3, 4 and 5 are sections of a detail on a greater scale. Fig. 6 is a section through a toothed gearing for a locomotive, provided with a reversing device according to the present invention. Fig. 7 is a view in part in section of this gearing the right portion showing the wheels seen from the right in Fig. 6, whereas the left portion shows the wheels seen from the left in Fig. 6. Fig. 8 is an axial section on a greater scale of a detail shown in Fig. 7.

Referring to Fig. 1, 1. 2 and 3 are three toothed wheels, of which 2 is in engagement with 1 and 1 with 3, the said wheels being mounted on shafts 4, 5 and 6 respectively. If it be supposed that 2 is the driving and 3 the driven wheel backwards running is obtained in the position shown, the movement being transmitted from the wheels 2 through the intermediate wheel 1 to the wheel 3, whereas forwards running is obtained by direct transmission of the motion between the wheels 2 and 3 when in engagement with each other. The shaft 4 is in known manner journalled in a lever 8 swingably journalled on a shaft 7, and the shaft 6 is journalled in a frame 9 swingably around the shaft 10 arranged at the one end of the frame which at its other end bears against the eccentric 11. By turning the lever 12 connected with the eccentric 11 in the direction of arrow 13, the shaft 4 of the toothed wheel 1 will move in the direction of arrow 14 around the shaft 7, and on account thereof the toothed wheel 1 is brought out of engagement with the toothed wheels 2 and 3. At the same time the eccentric 11 will raise the frame simultaneously with the shaft 6 bringing the toothed wheel 3 into engagement with the toothed wheel 2. In most cases it will occur that on moving two toothed wheels, for instance 2 and 3, in this manner to effect engagement two tops of the teeth will impinge on each other with the result that no engagement can take place. In order to make an engagement possible, one of the shafts carrying said wheels should be rotatable in such manner that the toothed wheel secured on said shaft can be turned in relation to the other wheel until a tooth is positioned opposite a tooth space, whereupon the engagement can be effected.

According to this invention the toothed wheel 2 is rotatable on the shaft 5 by means of a hand lever 15. This lever is connected with the shaft 5 in the manner described below.

A designates a device controlling the supply of oil to the different members of the reversing device. This controlling device consists of a cylinder 16 containing two pistons 17 and 18 connected with a lever 19 and 20 respectively. The piston 17 controls the supply of oil to the members to be adjusted in the reversing operation, whereas the piston 18 controls the supply of oil to a steam starting device of the turbine. Upon the first movement of the lever 19 in a direction at right angles to the plane of the paper the oil is admitted through the pipe 21 to the cylinder 22, which belongs to an apparatus B by means of which examination may be made whether the toothed wheels of the gearing are stopped or not. The oil presses down a piston 23 reciprocating in this cylinder 22 which piston forces the rollers 24 against the peripheries of the toothed wheels 2 and 3. If anyone of these wheels is rotating, also one of the rollers 24 is rotated and prevents the piston 23 from being depressed into the cylinder 22 by the oil pressure from the conduit 21 so far as is necessary for opening the passage to the pipe 25. This apparatus B will be described in detail with reference to Figs. 3, 4 and 5. If the toothed wheels 2 and 3 stop, the piston 23 can be forced into the cylinder 22 so far that the oil can flow from the conduit 21 into the pipe 25. This pipe leads to a cylinder 26 in which the piston 27 operates. The piston 27 is connected with a rack 28 meshing with a toothed rotary element 29, controlling the oil supply to other members of the reversing device as well as to the steam starting device of the turbine.

In the position shown the gearing is adjusted for backward running. For effecting forward running the lever 19 is turned further so that oil can flow into the pipe 30. By the first rotation of the lever 19 the rotary slide 29 has been turned to such a position that connection is established between the pipe 30 and the pipe 31, the oil being forced in below the piston 32 in the cylinder 33. The piston 32 is provided with teeth meshing with the toothed segment 35. The piston 32 being forced upwards by means of the oil pressure rotates the segment 35 causing the eccentric 11 to raise the frame 9 and simultaneously the wheel 1 obliquely upwards, said wheel being connected to the eccentric 11 by means of the link 36. Consequently, the wheel 1 will be brought out of engagement with the wheels 2 and 3. By the rotation of the eccentric 11 and by the raising of the frame 9, also the shaft 6 and the wheel 3 will be raised, whereby the wheel 3 will be brought into engagement with the wheel 2. Hereby the reversing operation is completed.

If backwards running is again desired the lever 19 is moved into the corresponding position. Oil will flow into the cylinder 33 above the piston 32 through the pipe 37 which communicates with the pipe 38 on account of the effected rotation of the element 29. By means of the oil pressure the segment 35 will be rotated in opposite direction, the frame will be lowered bringing the wheel 3 out of the engagement with the wheel 2, and the wheel 1 will be lowered into engagement with the wheels 2 and 3. In the figure the pipes 37 and 38 lie in part right behind the pipes 30 and 31.

Further the actuating device A is constructed so as to prevent rotation of the lever 19 and at the same time reversing unless the steam starting device of the turbine is closed. In order to begin a reversing operation the piston 17 must at first be moved axially towards the piston 18 causing a pin 40 to be inserted in a hole 41 in the piston 18. The pin 40 is secured to a disk 42 following the axial movement of the piston 17 but not its rotary movement. The pin 40 is always inserted in a hole 43 in a disk 44 which by means of a bolt 45 is retained in certain position in the cylinder 16 and consequently prevented from moving axially as well as peripherally. Consequently the pin 40 and the disk 42 are prevented from rotating. If the piston 17 is first moved axially in the direction of the arrow 45, the pin 40 will be inserted in the hole 41 thus preventing the piston 18 from being moved, that is to say the piston 18 is prevented from being moved by the lever 20. Should not the piston 18 be in the position corresponding to shutting position of the steam starting device, the hole 41 is not positioned opposite the pin 40, and on account thereof the lever 19 and the piston 17 cannot be moved in the direction of the arrow 45 that is to say no reversing operation can be effected.

In Figs. 3, 4 and 5 the apparatus B is shown in detail said apparatus comprising the cylinder 22 in which the piston 23 operates. The piston rod 47 passes through a sleeve 48 the lower portion of which is formed as a stirrup 49 or the like in which the shaft 50 of two half rollers 24 is journalled. The rollers are rotatably mounted on said shaft 50, independently of each other, and each of the rollers is provided with a semi-circular recess 51 in its periphery, said recesses forming a circular hole when the rollers are in their normal positions. The recesses in the peripheries of the rollers 24 are of such a size that the piston rod 47 may pass through, when the recesses 51 are in alignment, but said piston rod 47 is prevented from passing through the hole, when the rollers 24 and thus the recesses 51 are displaced in relation to each other, so that no circular hole is formed. Around the piston rod 47 are wound two spiral springs 52 and 53, which are of different strengths. At their upper ends both the springs abut against a flange 54 provided on the piston rod 47. At its lower end the weaker spring 52 abuts against a flange 56 projecting inwards from the wall of the cylinder 22, whereas the stronger spring 53 abuts at its lower end against the stirrup or sleeve 49. The rollers 24 are maintained in their normal positions by means of springs 55 or the like.

In operation the oil from pipe 21 presses down the piston 23 together with the piston rod 47, the sleeve 48 the stirrup 49 and the half rollers 24 against the action of the weaker spring 52 until the half rollers 24 come in contact with the toothed wheels 2 and 3. If these wheels are stopped, the oil pressure presses down the piston 23 further, but now the sleeve 48, the stirrup 49 and the rollers 24 do not take part in the movement downwards, but the piston rod 47 will be pressed down through the sleeve 48 against the action of the stronger spring 53 and will pass through the two semicircular recesses 51 and the peripheries of the rollers 24, which recesses now are in alignment with each other. The piston 23 will be pressed down to such an extent that the oil pipe 21 will be brought into communication with the oil pipe 25. On the other hand if anyone of the toothed wheels 2 and 3 is rotating, then this wheel will cause a turning of the corresponding roller 24 thus bringing its semicircular recess 51 out of alignment and preventing the piston rod 47 from being depressed further. In such case no communication will be provided between the pipes 21 and 25.

In order to rest assured that in the moment of reversing the teeth are opposite the tooth spaces it is necessary, as stated above, that one of the toothed wheels can be turned. According to the invention said rotation of the toothed wheel is effected by means of the lever 15, mounted on the shaft 5 in a manner disclosed in the following.

A toothed gearing according to the invention may advantageously be used in connection with transmission devices of turbine-driven locomotives. In this case the toothed wheel to be turned may be any one of the toothed wheels of the transmission gearing; it being however most suitable to choose the wheel by means of which said turning operation may be most readily performed for instance the driving wheel mounted on the turbine shaft.

Such a transmission gearing for a turbine-driven locomotive is illustrated in Figs. 6, 7 and 8. According to this construction the toothed wheels may perform the same radial movements for effecting the different directions of movement of the toothed gearing as described above. 60 is the turbine shaft, 61 an intermediate shaft and 62 a shaft from which the movement is transmitted to the driving wheels of the locomotive. Mounted on the shaft 60 is a pinion 63 meshing with a toothed wheel 64 rigidly mounted on the shaft 61. Mounted on this last-mentioned shaft 61 is a smaller toothed wheel 65 which may be brought in mesh on the one hand with a toothed wheel 66 secured on the shaft 62 and on the other hand with a reversing toothed wheel 68 secured on a shaft 67. The toothed wheel 68 may mesh with the toothed wheel 66. When the reversing operation has been performed so far that the toothed wheels 65, 66 and 68 are brought out of engagement with one another the turbine shaft 60 and the intermediate shaft 61 may be rotated by means of the hand lever 15 which by being moved in the direction of the arrow 70 may be connected for instance by the aid of claw or tooth coupling 71 with the turbine shaft 60 which then may be turned by turning the hand lever 15 at right angles to the plane of the drawing. By turning the turbine shaft 60 and the pinion 63 mounted thereon also the toothed wheel 64 is turned. If the operation is intended for forward running the turning movement should be so adjusted that the teeth of the pinion 65 on the shaft 61 are right before the tooth spaces of the wheel 66 and, consequently are adjusted to engagement. If on the other hand backward running is intended the pinion 65 is first turned in relation to the wheel 68 by turning the hand lever 15 until engagement is obtained, whereupon this wheel 68 is turned by further turning of the hand lever 15 by means of the wheel 65 to engagement with the wheel 66. Consequently all the wheels of the gearing can be turned by means of the hand lever 15.

Fig. 8 illustrates to a greater scale the position of the hand lever 15. The turbine shaft 60 is connected with a sleeve 73 by means of a diaphragm coupling 72, said sleeve 73 being provided with teeth as at 74 which may mesh with a toothed wheel 75, rigidly connected with a member 76. The hand lever 15 is swingable in the plane of the drawing in relation to said member 76 about the bolt 77 attached to the member 76. In order to effect a connection between the lever 15 and the turbine shaft 60, the member 76 together with the wheel 75 is moved by means of the lever 15 towards the sleeve 73 in the direction of the arrow 78, until the parts assume the position shown in Fig. 8 in which the toothed wheel 75 engages the teeth 74 on the sleeve 73, the hand lever 15 thereby being connected with the turbine shaft 60. By turning the hand lever 15 at right angles to the plane of the drawing, which turning movement is permitted by a sector-shaped recess being provided in the casing 73, the shaft 60 may be turned step by step at right angles to the drawing, while the mutual engagement of the members 75 and 76 is alternately maintained and interrupted.

What I claim and desire to secure by Letters-Patent is:

1. In reversing devices for toothed gearings comprising a driving toothed wheel, a driven toothed wheel adapted for forward running and a driven toothed wheel adapted for backward running, at least one of said wheels being adapted to be moved radially into and out of engagement with the others, the combination with fluid controlled means for effecting said radial movements, of means adapted to be actuated by hand for rotating one of said wheels in order to bring the teeth of the wheel opposite the corresponding tooth spaces, said means comprising a disengaging coupling normally rotatable in relation to anyone of the shafts of the wheels and means for connecting the coupling with said shaft.

2. In reversing devices for toothed gearings comprising a driving toothed wheel, a driven toothed wheel adapted for forward running and a driven toothed wheel adapted for backward running, at least one of said wheels being adapted to be moved radially into and out of engagement with the others, the combination with fluid controlled means for effecting said radial movements, of means for bringing the teeth of the wheel opposite the corresponding tooth spaces, said last-mentioned means consisting of a hand lever, said lever being adapted to be rotated in a plane situated in the longitudinal direction of the shaft of one of the wheels and in a plane situated at right angles to said shaft, a disengaging coupling normally rotatable in relation to said shaft, and means for connecting said coupling to said shaft by rotating the lever in the first-mentioned direction.

In testimony whereof I affix my signature.

FREDRIK LJUNGSTRÖM.